P. HOLBROOK.
Sugar Boiler.
No. 17,933.
Patented Aug. 4, 1857.
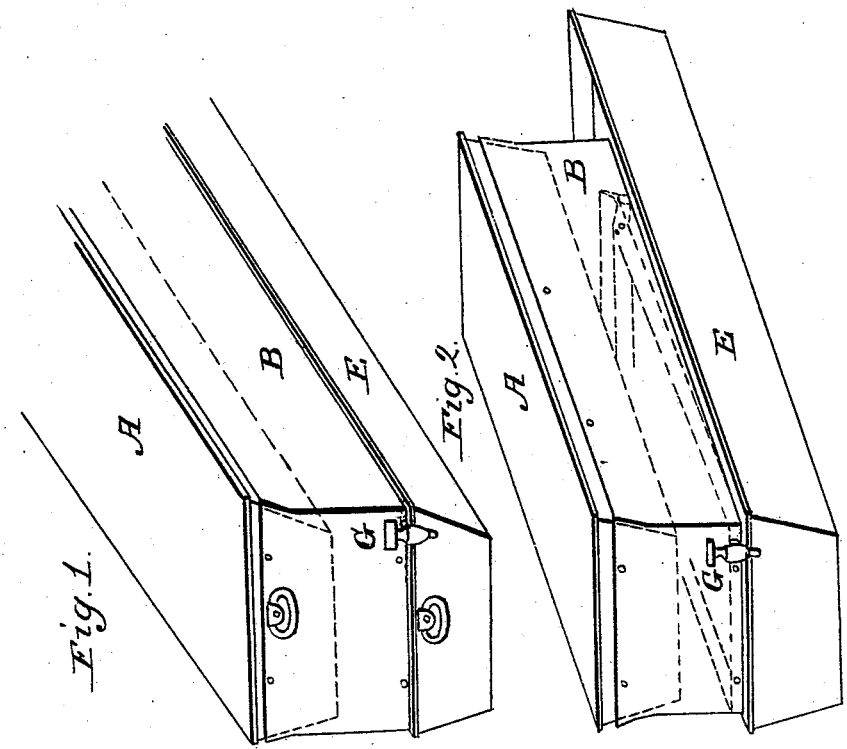
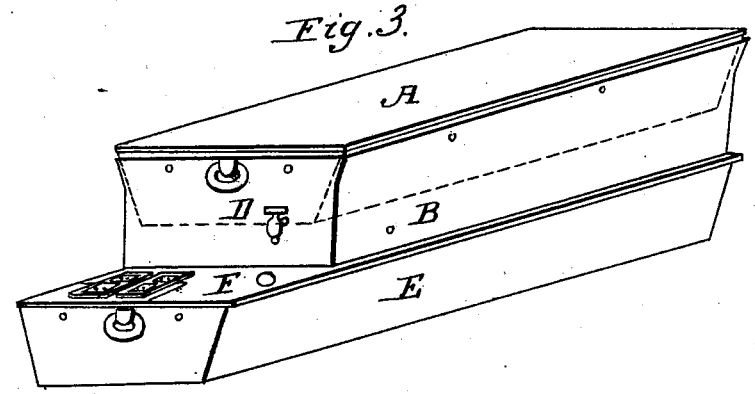
Witnesses.
Inventor:
Peter Holbrook

UNITED STATES PATENT OFFICE.

PETER HOLBROOK, OF WHITINGHAM, VERMONT.

IMPROVEMENT IN SUGAR-BOILERS.

Specification forming part of Letters Patent No. 17,933, dated August 4, 1857.

*To all whom it may concern:*

Be it known that I, PETER HOLBROOK, of Whitingham, in the county of Windham, in the State of Vermont, have invented a new and Improved Mode of Constructing an Apparatus to Make Maple-Sugar in, which I call a "Sap-Boiler;" and I do hereby declare that the following is a full and correct description thereof, reference being had to the accompanying drawings, and to the letters of reference marked thereon.

The nature of my invention consists of a steam-pan connected with a sap-pan made of tin or sheet-iron, with rivets or solder, stop-cocks, and a cover to a sirup-pan.

To enable others skilled in the art to make and use my invention, I will proceed to describe its construction and operation.

I construct a sap-pan of tin or sheet-iron, as shown at A, about five feet long, and about two and a half feet wide at the top, and about seven inches high from the level of its bottom. The sides and ends are beveling about one inch from top to bottom. At the top edge of this pan there is a wire inclosed. This is done by turning the top edge of the tin or sheet-iron over the wire. This is to give strength and stability to it. This pan is to receive the sap from the trees. I now construct what I call a "steam-pan," of tin or sheet-iron, as shown at B, about as long and wide as the sap-pan A. The sides and ends of it are one foot high and perpendicular, with a wire inclosed in the lower edge. This is done by turning the lower edge of the tin or sheet-iron over the wire. This is to give strength and stability to this pan. Next, I fit a bottom to the perpendicular sides and one end, with one end elevated above the other about one inch, and turn up the side edges, so that they can be riveted or soldered to the perpendicular sides and end. The lower end of this bottom is on or nearly on a level with the lower edges of the perpendicular sides and ends of this pan. At the elevated end of this bottom there is a space of one inch in width, the width of this bottom, left open to admit steam through and heat the sap in the sap-pan A above it, and this end is turned up about one-eighth of an inch. I now insert a stop-cock, C, near one of the lower corners of this steam-pan B, and solder it to the pan. This is to drain off the water that may be condensed from the steam. I now place this steam-pan B directly under the above-described sap-pan A, that is to receive the sap from the trees, and make the perpendicular sides and ends of the steam-pan B fit up to the inclosed wire at the top edge of the sap-pan A, and rivet or solder its perpendicular sides and ends to the sides and ends of the sap-pan A. I now insert a stop-cock, D, through one of the perpendicular ends of the steam-pan B into the sap-pan A, near one corner, and solder it to the pan at that end which admits the steam of the steam-pan B through the one-inch space. This stop-cock D is to draw off the sap from the sap-pan A into a sirup-pan, E, which is situated below the steam-pan B. I now construct a sirup-pan, E, about the same width and depth of the sap-pan A, and six inches longer, and make a cover, F, of boards, from a half to three-fourths of an inch in thickness. I now construct a small lid at one end of this cover, about five inches wide and two feet long, and connect it with hinges to the cover F at one end. The use of this lid is to admit of an examination of the sirup in the sirup-pan E at any time when necessary. I now make an opening in this cover F of about one inch wide and about two feet long, at the end of which the lid is attached. This opening in this cover is made directly under the space of the steam-pan B. I now take a piece of wood one inch square, and as long as the steam-pan B is wide, and place it under the elevated end of the bottom of the steam-pan B, and resting on this cover F, next to the opening, to support the elevated bottom of the steam-pan B. This opening in the cover F is to let the steam up through from the boiling sirup in the sirup-pan E. I now make a hole through this cover F directly under the stop-cock D of the sap-pan A of sufficient size to admit the sap through into the sirup-pan E from the stop-cock D. I now make and rivet or solder a handle at each end of the sap-pan A, and at each end of the sirup-pan E. These handles are for the purpose of moving the pans from the furnace when necessary.

What I claim as my invention, and desire to secure by Letters Patent, is—

The steam-pan B, in combination with the sap-pan A, and the cover F, to the sirup-pan E, and the stop-cocks C and D, to the steam-pan B and sap-pan A, or their equivalents, and arranged substantially in the manner and for the purpose set forth.

PETER HOLBROOK.

Witnesses:
E. W. HOLBROOK,
R. C. HOLBROOK.